(12) United States Patent
Cacciatori et al.

(10) Patent No.: US 11,747,652 B1
(45) Date of Patent: Sep. 5, 2023

(54) OPHTHALMIC EYEWEAR LENS DESIGN SYSTEM

(71) Applicant: OptoPlus Srl, Rome (IT)

(72) Inventors: Alessandro Cacciatori, Rome (IT); Emilio Mazzocco, Rome (IT); Francesco Mazzocco, Rome (IT); Alessandro Tucci, Rome (IT)

(*) Notice: Subject to any disclaimer, the term of this patent is extended or adjusted under 35 U.S.C. 154(b) by 0 days.

(21) Appl. No.: 18/303,538

(22) Filed: Apr. 19, 2023

(51) Int. Cl.
*G02C 7/02* (2006.01)
*G02C 7/06* (2006.01)

(52) U.S. Cl.
CPC ............ *G02C 7/027* (2013.01); *G02C 7/028* (2013.01); *G02C 7/066* (2013.01)

(58) Field of Classification Search
CPC ......... G02C 7/027; G02C 7/028; G02C 7/066
USPC ................... 351/41, 159.01, 159.73, 159.74
See application file for complete search history.

(56) References Cited

U.S. PATENT DOCUMENTS

2022/0026741 A1* 1/2022 Tranvouez-Bernardin ................. A61B 5/1116

* cited by examiner

*Primary Examiner* — Tuyen Tra
(74) *Attorney, Agent, or Firm* — RC Trademark Company

(57) ABSTRACT

According to some embodiments, a method for determining a progressive ophthalmic eyewear lens design specific to an eyewear lens shape is discloses. The method includes receiving (i) an eyewear lens shape trace file and (ii) patient data. The eyewear lens shape trace file is converted into a plurality of location data points. Lens data is created based on the combination of the location data points with the patient data. A plurality of lens designs, viewable as lens maps associated with the eyewear lens shaped, is determined based on various combinations of the lens data. One of the plurality of lens designs that displays a least amount of distortion, a widest viewable field, a widest distance, and intermediate and near zones with a least amount of visual disruption is then determined and transmitted to a lens manufacturing machine.

20 Claims, 5 Drawing Sheets

100

```
┌─────────────────────────────────────────────────────────┐
│ Receiving, at a processor, (i) an eyewear lens          │
│ shape trace file and (ii) patient data                  │
│                                                     110 │
└─────────────────────────────────────────────────────────┘
                            ▲
                            ▼
┌─────────────────────────────────────────────────────────┐
│ Converting, via the processor, the eyewear lens shape   │
│ trace file into a plurality of location data points     │
│                                                     120 │
└─────────────────────────────────────────────────────────┘
                            ▲
                            ▼
┌─────────────────────────────────────────────────────────┐
│ Combining the location data points with the patient data,│
│ via the processor, to determine lens data               │
│                                                     130 │
└─────────────────────────────────────────────────────────┘
                            ▲
                            ▼
┌─────────────────────────────────────────────────────────┐
│ Determining, via the processor, a plurality of lens designs│
│ viewable as lens maps associated with the eyewear lens  │
│ shaped based on various combinations of the lens data   │
│                                                     140 │
└─────────────────────────────────────────────────────────┘
                            ▲
                            ▼
┌─────────────────────────────────────────────────────────┐
│ Determining, via the processor, one of the plurality of │
│ lens maps that displays a least amount of distortion,   │
│ a widest viewable field, a widest distance, and intermediate│
│ and near zones with a least amount of visual disruption │
│                                                     150 │
└─────────────────────────────────────────────────────────┘
                            ▲
                            ▼
┌─────────────────────────────────────────────────────────┐
│ Transmitting, via the processor, the one of the plurality of lens designs│
│ associated with the received indication to a lens manufacturing machine│
│                                                     160 │
└─────────────────────────────────────────────────────────┘
```

OPHTHALMIC EYEWEAR LENS DESIGN SYSTEM

BACKGROUND

Computer numerical control (CNC) manufacturing methods are typically used for the manufacture of progressive eyewear lenses. Each progressive eyewear lens typically includes a near vision portion, a distance vision portion and/or an intermediate portion. These portions are created in the lens using CNC manufacturing methods. However, varying the style (e.g., a shape) of the lens can affect how a user sees through a particular style of lens and thus a one size fits all manufacturing approach leaves many lens styles with various degrees of distortion or a limited viewable field. Therefore, a system to reduce distortion and increase a viewable field in eyewear lenses is desirable.

SUMMARY

Some embodiments described herein relate to a system and method for determining a progressive ophthalmic eyewear lens design specific to an eyewear lens shape. The method includes receiving (i) an eyewear lens shape trace file and (ii) patient data. The eyewear lens shape trace file is converted into a plurality of location data points. Lens data is created based on combining the location data points with the patient data. A plurality of lens designs, viewable as lens maps associated with the eyewear lens shaped, is determined based on various combinations of the lens data. One of the pluralities of lens designs that displays a least amount of distortion, a widest viewable field, a widest distance, and intermediate and near zones with a least amount of visual disruption is then determined and transmitted to a lens manufacturing machine.

BRIEF DESCRIPTION OF THE DRAWING

FIG. 1 illustrates a method in accordance with some embodiments.

DETAILED DESCRIPTION

Figure 2:
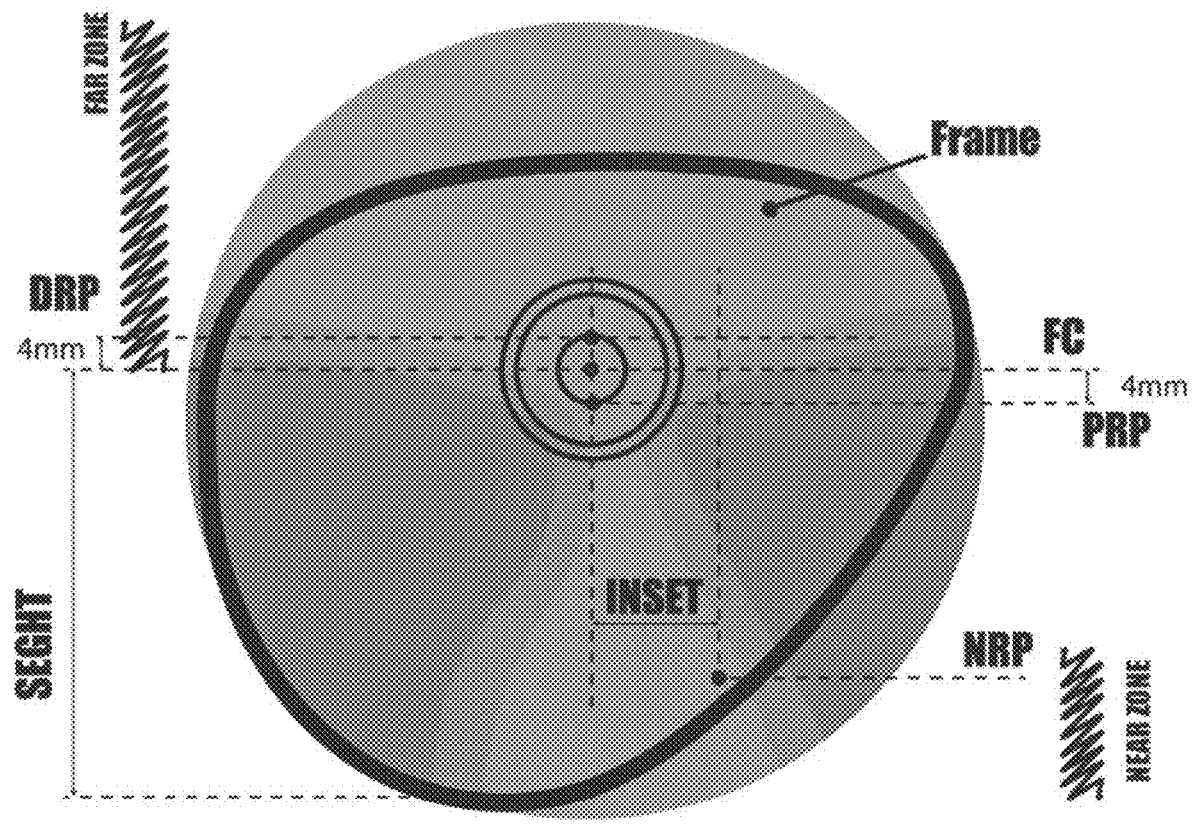
FIG. 2 illustrates a lens in accordance with some embodiments.

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

Now referring to FIG. 1, a method 100 that might be performed by an eyewear lens design system is illustrated. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 100 may relate to determining a plurality of eyewear lens designs associated with a particular lens style and then determining a design that when it is manufactured, distortion is reduced, and a viewable area is increased. Now referring to 110, an eyewear lens shape trace file and patient data is received at an eyewear lens design system. The eyewear lens trace file and the patient data may be received at a processor associated with the eyewear lens design system such as, but not limited to, the processor described with respect to FIG. 4. The eyewear lens shape trace file may comprise a data set representative of a shape of the lens has been traced. The patient data may comprise data associated with a patient's prescription such as, but not limited to, sphere (SPH) information, cylinder (CYL) information, pupil distance, DV [distance vision/nearsightedness] information, NV [near vision/reading] information, and/or prism information such as PRISM & BASE.

Next at 110, the eyewear lens shape trace file is converted into a plurality of location data points. The data points may comprise a data set of coordinates (e.g., X, Y, Z coordinates) associated with the particular lens shape. At 130, the location data points are combined with the patient data, via a processor, to determine lens data. The lens data may be what defines how a patient's prescription will be implemented on a lens. In other words, the lens data may comprise the information that maps different areas of the particular lens shape to a patient's prescription so that the lens can be manufactured based on the patient's prescription.

Once the lens data is determined, a plurality of lens designs that are viewable as lens maps are determined at 140. Lens maps, such as those shown with respect to FIG. 2 and FIG. 3, visually illustrate Each of the plurality of lens designs are associated with a different combination of patient data and location data points. In other words, each lens design is based on one of a variety of combinations of the lens data.

Figure 3:
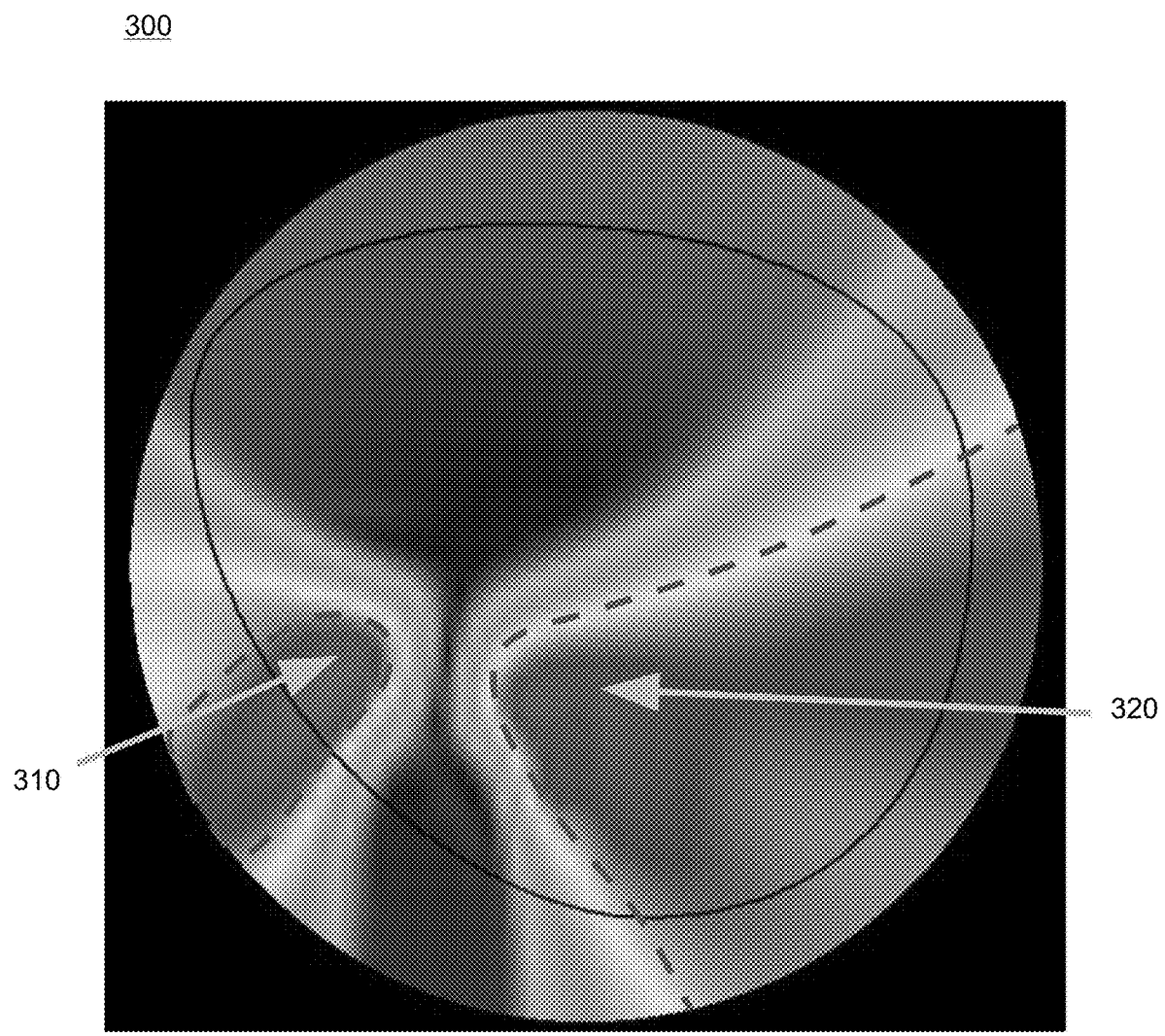
FIG. 3 illustrates a lens map in accordance with some embodiments.
Figure 4:
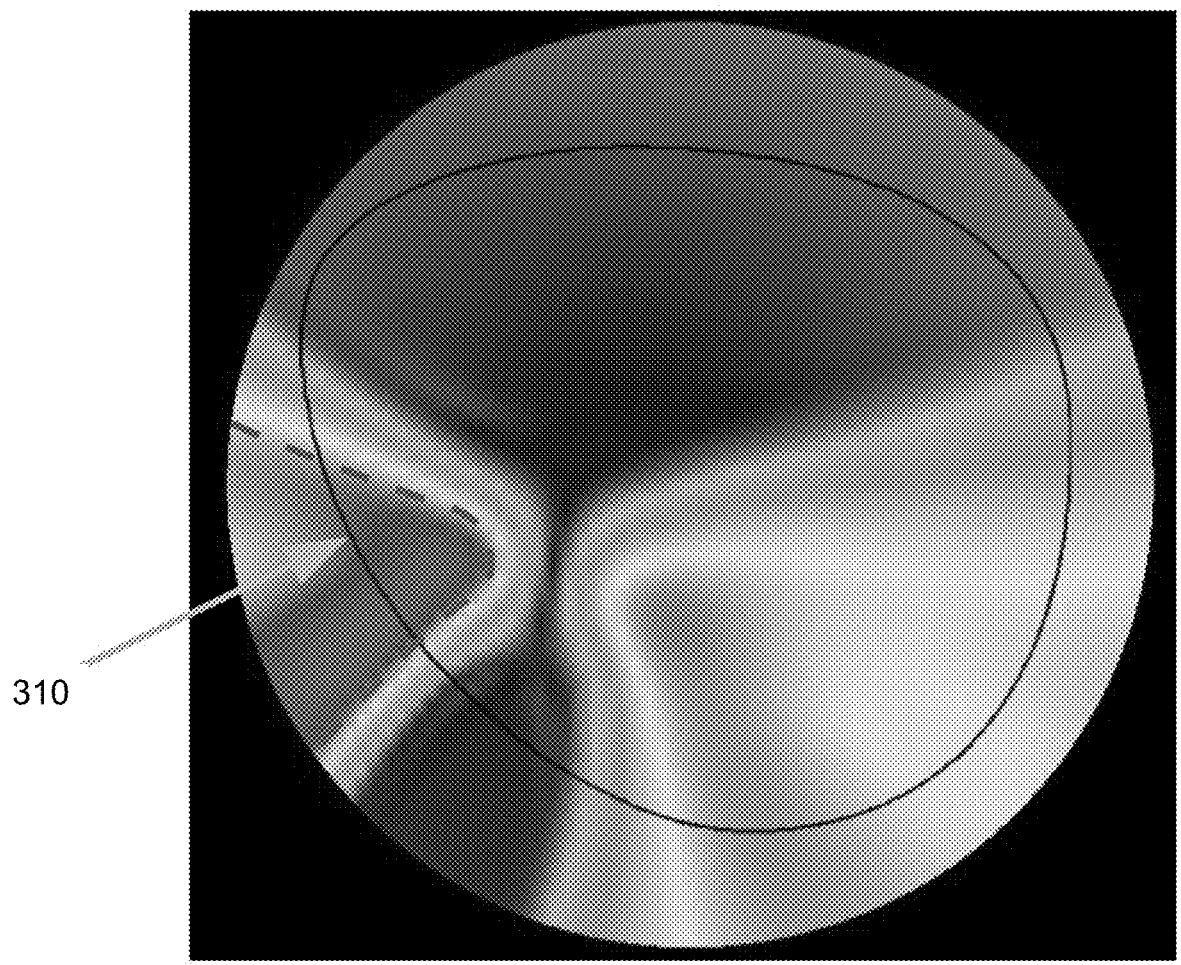
FIG. 4 illustrates a lens map in accordance with some embodiments.
Figure 5:
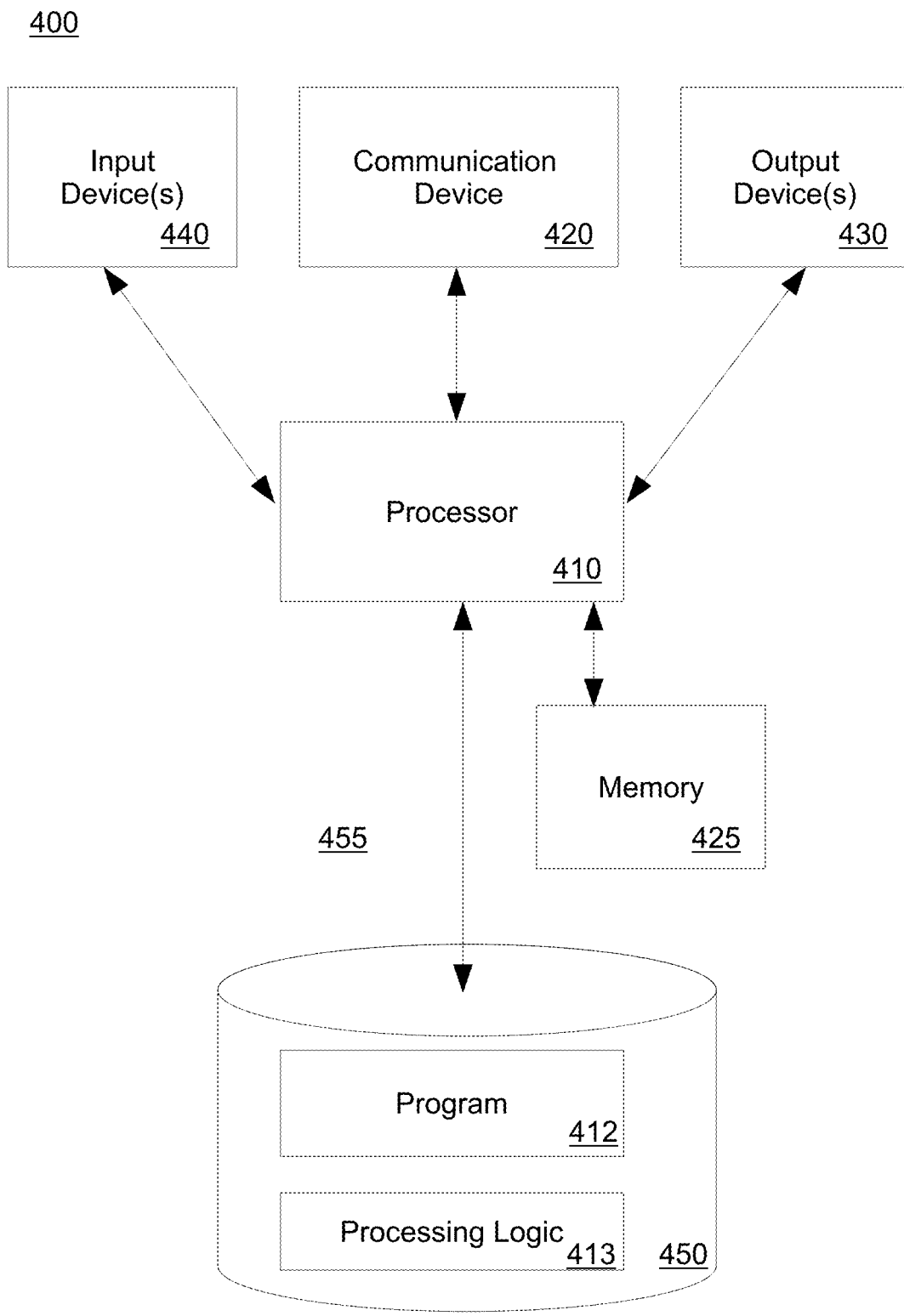
FIG. 5 illustrates a lens design system in accordance with some embodiments.

For purposes of illustrating features of the present embodiments, an example will now be introduced and referenced throughout the disclosure. Those skilled in the art will recognize that this example is illustrative and is not limiting and is provided purely for explanatory purposes. Turning now to FIG. 3 and FIG. 4, examples of lens maps 300/350 are illustrated. Each lens map 300/350 is a based on a combination of different lens data. As show in in FIG. 2, first distortion area 310 and second distortion area 320 each represent different areas of the lens where distortion (e.g., an astigmatism value) in the lens is present. As the first distortion area 310 is placed in a "not so used" lens area (e.g., the "nasal side" of the lens) and the second distortion area is placed on the a most used lens area (e.g., the "temporal side"), the astigmatism in the second distortion area 320 may be more annoying to a wearer compared to the first distortion area 310. First distortion area 310 and second distortion area 320 each represent how these areas will be manufactured using a CNC manufacturing system.

First distortion area 310 and second distortion area 320 may be displayed in a color chart (e.g., dark red areas) or as any other color or pattern. In some embodiments, these colors/patterns may be determined using a spline math function. The spline math function calculation gives us a visual representation of the calculations (e.g., color images representing different value) so that we can see which spline calculation looks best. These colors/patterns may be determined using a function which associates distortion values and hue values. The latter may be picked from the whole iris spectrum in order to associate the lowest value to the blue color and the highest value to the purple color. Such an association may provide us a visual representation of the calculations (e.g., color images representing different value) so that we can see which spline-based delimitation of the vision areas looks best. A spline math function is a function that is defined by piecewise polynomials. The coefficients of the polynomial may differ from interval to interval, but the order of the polynomial is the same. The variable parameters (e.g., coefficients) in the spline calculation may be associated with (i) a far progressive area that has at least 90% of the width of the spline function that delimit the far area, (ii) a near progressive area that is at least 6 mm vertically, (iii) a near progressive area that may be rotated (without affecting the inset) in accordance of the bottom frame shape, of the IPD (e.g., Monocular centration distance) and of the half pupilar distance value.

All lens designs (e.g., the settings associated with each lens design) may be compared and the system may select the ones which create a design with a lower astigmatism value in the most used lens area (e.g., a temporal side of the lens which, looking at a right lens, the temporal side is the right part of the lens) or in the worst case, an astigmatism value similar to the required addition value. (e.g., if a lens is an addition 2, maximum astigmatism values must be around 2).

First distortion area 310 and second distortion area 320 each represent unwanted astigmatism created in the lenses based on the how it will be manufactured using a CNC manufacturing system. These areas would cause distortion for the wearer of the eyeglasses. With a reduced amount of distortion, a wider viewing area is created for patients viewing through the lenses.

One of the plurality of lens designs that displays a least amount of distortion, a widest viewable field, a widest distance, and intermediate and near zones with a least amount of visual disruption is determined at 150. Continuing with the above example, first distortion area 310 and second distortion area 320 are present in FIG. 3. However, in FIG. 4, the first distortion area 310 is smaller and the second distortion are 320 has been eliminated. Therefore, the lens design associated with FIG. 4 comprise less distortion and thus a wider viewing are for the patient viewing though the lens.

After each design calculation, power value, cylinder value, axe value and thickness value, for each lens points together with point coordinates are saved in a data storage and may be referred to as "analysis results". The analysis results may be compared based on the following checks. The checks may be based on the calculated lens map being mapped as a cartesian plane:

FAR ZONE CHECKING: In the far zone checking, a Y value of a nasal crossing point and a Y value of a temporal crossing point from the splines and the frame shape, must differ at most by 1 mm. The advantage of having the same Y value for both nasal and temporal side is that symmetric vision on both eyes is always highly probable.

NEAR ZONE CHECKING: In the near zone checking, a distance of the nasal crossing point from the splines and the frames shape and a distance of the temporal crossing point from the splines and the frames shape must be at least of 12 mm to guarantee a natural eye movement during the reading activities.

DIOPTRIC POWER CHECKING: In the dioptric power checking, based on a real base associated with a lens (e.g., from the lab request file), the dioptric power (e.g., SPH, CYL and AXE) may be calculated for each lens point.

The present system may then compare (1) the requested dioptric power for the far zone and the results dioptric power in the DRP design point (e.g., taking in exam the personalization values such as: wrap and tilt angles) and (2) the requested dioptric power for the near zone and the result dioptric power in the NRP design point (e.g., tacking in exam the personalization values such as: wrap and tilt angles).

If far zone checking and near zone checking as described above are not respected, the system described herein may proceed with a new design calculation based on a binary search for the far and the near zone. When far zone checking and near zone checking are respected, the system continues with the dioptric power checking described above.

If the dioptric power checking is not respected, the system described herein may proceed with a new design dioptric power calculation until the dioptric power checking is well respected.

Several lens design types are based on different tensor splines (T-Splines), and different spline nodes (starting from a minimum of 3 nodes). For each design type, the system described herein selects (as described in the previous three checks) the best settings. For each best selected design setting (based on the previously described three checks), the best design type may be selected by checking the average astigmatism value for the far zone and the near zone.

The average astigmatism value for the far zone is based on the lens area starting from the FC to the lens top and the near zone is the lens area starting from 2 mm above the NRP to the lens bottom. These can be seen in FIG. 2. As illustrated in FIG. 2, a DRP (Data Reference Point) is the area outlined for verifying the distance Rx power, generally located approximately 4 mm above the Fitting Point (also called Fitting Cross) FC (Fitting Point or Fitting Cross): The Fitting Cross may be considered a landmark that simultaneously defines the location of the point in the lens that gives the prescribed refracting power for distance (DRP), the point that gives the refracting power for near (NRP) and the point that gives the location of the prism reference point (PRP). The PRP (Prism Reference Point) is a vertical measurement in millimeters from the bottom of the lens in your frames, to the beginning of the progressive addition on a progressive lens FC. The NRP (Near Reference Point) is the area in a progressive lens used to verify the full reading power. The SEGHT (Seg Height) is the vertical measurement in millimeters from the bottom of the lens in your frames, to the beginning of the progressive addition on a progressive lens. The INSET is the horizontal shift of the reading area towards the nasal side of the lens with respect to the distance reference point.

Once the one of the plurality of lens designs is determined, the one of the plurality of lens designs is transmitted to a lens manufacturing machine at 160 to manufacture the lens for a patient. In some embodiments, the lens manufacturing machine may comprise a CNC machine.

The embodiments described herein may be implemented using any number of different hardware configurations or lens manufacturing machines. For example, FIG. 4 illustrates an eyewear lens design system 400 that may be, for example, associated with the method 100 of FIG. 1. The eyewear lens design system 400 may provide a technical and commercial advantage by being able to determine mapping associated with a particular lens style such that when it is manufactured, distortion is reduced, and a viewable area is increased.

The eyewear lens design system 400 may comprise a processor 410 ("processor"), such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more machines on a network. The eyewear lens design system 400 further includes an input device 440 (e.g., a mouse and/or keyboard to enter patient data) and an output device 430 (e.g., to output and display various lens designs or a selected lens design).

The processor 410 also communicates with a memory 425 and storage device 450 that stores data 413. The storage device 450 may comprise any appropriate information storage device, including combinations of magnetic storage devices (e.g., a hard disk drive), optical storage devices, mobile telephones, and/or semiconductor memory devices. The storage device 450 may store a program 412 and/or processing logic 413 for controlling the processor 410. The processor 410 performs instructions of the programs 412, 413, and thereby operates in accordance with any of the embodiments described herein. For example, the processor 410 may receive patient data and a lens trace file and may determine a preferable lens design via the instructions of the programs 412 and processing logic 413.

The programs 412, 413 may be stored in a compiled, compressed, uncompiled and/or encrypted format or a combination. The programs 412, 413 may furthermore include other program elements, such as an operating system, a database management system, and/or device drivers used by the processor 410 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A method of determining a progressive ophthalmic eyewear lens design specific to an eyewear lens shape, the method comprising:
   receiving, at a processor, (i) an eyewear lens shape trace file and (ii) patient data;
   converting, via the processor, the eyewear lens shape trace file into a plurality of location data points;
   combining the location data points with the patient data, via the processor, to determine lens data;
   determining, via the processor, a plurality of lens designs viewable as lens maps associated with the eyewear lens shaped based on various combinations of the lens data;
   determining, via the processor, one of the plurality of lens designs that displays a least amount of distortion, a widest viewable field, a widest distance, and intermediate and near zones with a least amount of visual disruption; and
   transmitting, via the processor, the one of the plurality of lens designs to a lens manufacturing machine.

2. The method claim 1, wherein determining a plurality of lens designs viewable as lens maps is based on a spline math function calculation that provides a visual representation of the calculations.

3. The method of claim 1, wherein receiving the indication of the one of the plurality of lens maps is based on a user viewing a plurality of spline calculations presented as color maps and the user selects which spline calculation looks best.

4. The method of claim 1, wherein each of the plurality of lens designs comprises a far progressive area and a near progressive area.

5. The method of claim 4, wherein receiving an indication of one of the plurality of lens maps that displays a least amount of distortion, a widest viewable field, a widest distance, and intermediate and near zones with a least amount of visual disruption comprises a spline calculation that displays a far progressive area having at least ninety percent of the width of the spline function that delimit the far area.

6. The method of claim 5, wherein the near progressive area is at least 6 mm vertically and at least 14 mm horizontally.

7. The method of claim 5, wherein the near progressive area is rotated in accordance with (i) a bottom frame shape, (ii) a monocular centration distance and (iii) the half pupilar distance value.

8. The method of claim 7, wherein if the one of the plurality of lens designs is associated with a positive lens, the lens design is based on a border frame thickness required by the lab.

9. The method of claim 7, wherein if the one of the plurality of lens designs is associated with a negative lens, the lens design is based on a lens center thickness required by the lab.

10. The method of claim 1, further displaying, via the processor, the one of the plurality of lens maps.

11. A system of determining a progressive ophthalmic eyewear lens design specific to an eyewear lens shape, the system comprising:
a processor; and
a non-transitory computer readable medium, that when executed by a processor performs a method, the method comprising:
receiving, at a processor, (i) an eyewear lens shape trace file and (ii) patient data;
converting, via the processor, the eyewear lens shape trace file into a plurality of location data points;
combining the location data points with the patient data, via the processor, to determine lens data;
determining, via the processor, a plurality of lens designs viewable as lens maps associated with the eyewear lens shaped based on various combinations of the lens data;
determining, via the processor, one of the plurality of lens designs that displays a least amount of distortion, a widest viewable field, a widest distance, and intermediate and near zones with a least amount of visual disruption; and
transmitting, via the processor, the one of the plurality of lens designs to a lens manufacturing machine.

12. The system of claim 11, wherein determining a plurality of lens designs viewable as lens maps is based on a spline math function calculation that provides a visual representation of the calculations.

13. The system of claim 11, wherein receiving the indication of the one of the plurality of lens maps is based on a user viewing a plurality of spline calculations presented as color maps and the user selects which spline calculation looks best.

14. The system of claim 11, wherein each of the plurality of lens designs comprises a far progressive area and a near progressive area.

15. The system of claim 14, wherein receiving an indication of one of the plurality of lens maps that displays a least amount of distortion, a widest viewable field, a widest distance, and intermediate and near zones with a least amount of visual disruption comprises a spline calculation that displays a far progressive area having at least ninety percent of the width of the spline function that delimit the far area.

16. The system of claim 15, wherein the near progressive area is at least 6 mm vertically and at least 14 mm horizontally.

17. The system of claim 15, wherein the near progressive area is rotated in accordance with (i) a bottom frame shape, (ii) a monocular centration distance and (iii) the half pupilar distance value.

18. The system of claim 17, wherein if the one of the plurality of lens designs is associated with a positive lens, the lens design is based on a border frame thickness required by the lab.

19. The system of claim 17, wherein if the one of the plurality of lens designs is associated with a negative lens, the lens design is based on a lens center thickness required by the lab.

20. A non-transitory computer readable medium, that when executed by a processor performs a method, the method comprising:
receiving, at a processor, (i) an eyewear lens shape trace file and (ii) patient data;
converting, via the processor, the eyewear lens shape trace file into a plurality of location data points;
combining the location data points with the patient data, via the processor, to determine lens data;
determining, via the processor, a plurality of lens designs viewable as lens maps associated with the eyewear lens shaped based on various combinations of the lens data;
determining, via the processor, one of the plurality of lens designs that displays a least amount of distortion, a widest viewable field, a widest distance, and intermediate and near zones with a least amount of visual disruption; and
transmitting, via the processor, the one of the plurality of lens designs to a lens manufacturing machine.

* * * * *